United States Patent
Doyle

(10) Patent No.: US 7,030,661 B1
(45) Date of Patent: Apr. 18, 2006

(54) POWER SUPPLY SYSTEM AND METHOD THAT PROVIDES A LOW-COST APPROACH TO VOLTAGE SCALING

(75) Inventor: James Thomas Doyle, Nederland, CO (US)

(73) Assignee: National Semiconductor Corporation, Santa Clara, CA (US)

( * ) Notice: Subject to any disclaimer, the term of this patent is extended or adjusted under 35 U.S.C. 154(b) by 251 days.

(21) Appl. No.: 10/730,658

(22) Filed: Dec. 8, 2003

(51) Int. Cl.
*G05F 1/10* (2006.01)

(52) U.S. Cl. ...................... 327/102; 327/544

(58) Field of Classification Search ................ 327/102, 327/530, 534, 535, 537, 538, 540, 541, 543, 327/544
See application file for complete search history.

(56) References Cited

U.S. PATENT DOCUMENTS

| | | | |
|---|---|---|---|
| 5,602,882 A | 2/1997 | Co et al. | 375/372 |
| 6,137,346 A * | 10/2000 | Miller | 327/538 |
| 6,157,247 A | 12/2000 | Abdesselem et al. | 327/540 |
| 6,262,611 B1 | 7/2001 | Takeuchi | 327/159 |
| 6,317,008 B1 | 11/2001 | Gabara | 331/117 R |
| 6,351,165 B1 | 2/2002 | Gregorian et al. | 327/156 |
| 6,498,512 B1 | 12/2002 | Simon et al. | 326/93 |
| 6,720,808 B1 | 4/2004 | Chan | 327/143 |

OTHER PUBLICATIONS

Dragan Maksimovic, Bruno Kranzen, Sandeep Dhar and Ravindra Ambatipudi, U.S. Appl. No. 10/053,226, filed Jan. 19, 2002, entitled "An Adaptive Voltage Scaling Digital Processing Component and Method of Operating the Same".

Bruno Kranzen and Dragan Maksimovic, U.S. Appl. No. 10/053,227, filed Jan. 19, 2002, entitled "Adaptive Voltage Scaling Clock Generator for Use in a Digital Processing Component and Method of Operating the Same".

Dragan Maksimovic and Sandeep Dhar, U.S. Appl. No. 10/053,828, filed Jan. 19, 2002, entitled "System for Adjusting a Power Supply Level of a Digital Processing Component and Method of Operating the Same".

Dragan Maksimovic, Ravindra Ambatipudi, Sandeep Dhar and Bruno Krazen, U.S. Appl. No. 10/053,228, filed Jan. 19, 2002, entitled "An Adaptive Voltage Scaling Power Supply for Use in a Digital Processing Component and Method of Operating the Same".

James T. Doyle and Dragan Maksimovic, U.S. Appl. No. 10/160,428, filed Mar. 26, 2002, entitled "Method and System for Minimizing Power Consumption in Mobile Devices Using Cooperative Adaptive Voltage and Threshold Scaling".

(Continued)

*Primary Examiner*—Jeffrey Zweizig
(74) *Attorney, Agent, or Firm*—Mark C. Pickering

(57) ABSTRACT

A low-cost approach to voltage scaling is realized by latching the output of a propagation delay detector, and inputting the latched output to a string digital-to-analog (DAC) converter. The string DAC generates a DC voltage in response to the latched values, which is fed back to the propagation delay detector.

24 Claims, 10 Drawing Sheets

OTHER PUBLICATIONS

Dragan Maksimovic and James Thomas Doyle, U.S. Appl. No. 10/166,822, filed Jun. 10, 2002, entitled "Serial Digital Communication Superimposed on a Digital Signal Over a Single Wire".

Dragan Maksimovic and Sandeep Dhar, U.S. Appl. No. 10/236,482, filed Sep. 6, 2002, entitled "Method and System for Providing Self-Calibration for Adaptively Adjusting a Power Supply Voltage in a Digital Processing System".

Dragan Maksimovic and Sandeep Dhar, U.S. Appl. No. 10/272,027, filed Oct. 15, 2002, entitled "All Digital Power Supply System and Method That Provides a Substantially Constant Supply Voltage Over Changes in PVT Without a Band Gap Reference Voltage".

Wai Cheong Chan and Donald Kevin Cameron, U.S. Appl. No. 10/324,997, filed Dec. 18, 2002, entitled "System and Method for Signal Delay in an Adaptive Voltage Scaling Slack Detector".

Mark F. Rives, U.S. Appl. No. 10/246,971, filed Sep. 19, 2002, entitled "Power Supply System and Method that Utilizes an Open Loop Power Supply Control".

Jim Doyle and Bill Broach, Small Gains in Power Efficiency Now, Bigger Gains Tomorrow [online]. Jul. 9, 2002 [retrieved on Feb. 1, 2003]. Retrieved from the Internet: – URL: http://www.commsdesign.com/design_corner/OEG20020709S0022>. pps. 1-5.

Robert W. Erickson and Dragan Maksimovic, *Fundamentals of Power Electronics*, Second Edition, Kluwer Academic Publishers, 2001, pp. 333.

Krisztian Flautner, Steven Reinhardt and Trevor Mudge, Automatic Performance Setting for Dynamic Voltage Scaling, Wireless Networks, vol. 8, Issue 5, Sep. 2002, pps. 507-520, and Citation, pps. 1-3, [online]. [retrieved on Feb. 2, 2003]. Retrieved from the Internet: <URL: http://portal.acm.org/citation.cfm?id=582455.582463&coll=portal&dl=ACM&idx=J804&p . . . >.

Krisztian Flautner, Steven Reinhardt and Trevor Mudge, Automatic Performance Setting for Dynamic Voltage Scaling [online]. May 30, 2001, [retrieved on Feb. 2, 2003]. Retrieved from the Internet: <URL: http://www.eecs.umich.edu/~tnm/papers/mobicom01.pdf>. pps. 1-12.

Texas Instruments, "Synchronous-Buck PWM Controller With NMOS LDO Controller", TPS5110, SLVS025A- Apr. 2002, Revised Jun. 2002.

Intel XScale Core, Developer's Manual, Dec. 2000, [online], [retrieved on Feb. 2, 2002]. Retrieved from the Internet: <URL: http://developer.intel.com/design/intelxscale/27347301.pdf>. pps. 1-1 through B-1.

U.S. Appl. No. 10/351,061, filed Jan. 24, 2003, Chan et al.

U.S. Appl. No. 10/351,056, filed Jan. 24, 2003, Chan et al.

U.S. Appl. No. 10/402,091, filed Mar. 28, 2003, Doyle.

Kaushik Roy, Leakage Tolerant Circuits, Sub-Threshold Logic [online]. No date, [retrieved by inventor approximately Nov. 1, 2002]. Retrieved from the Internet: <URL:http://www.ece.purdue.edu/~visi/seven.pdf>. pps. 1-43.

Benjamin James Patella, "Implementation of a High Frequency, Low-Power Digital Pulse Width Modulation Controller Chip", Thesis Submitted To Graduate School of University of Colorado in Department of Electrical and Computer Engineering, 2000, pps. 1-272.

John G. Maneatis, "Low-Jitter Process-Independent DDL and PLL Based on Self-Biased Techniques", 1996 ISCCC8. 1 Presentation Slides, 3 sheets, IEEE Journal of Solid-State Circuits, vol. 31, No. 11, Nov. 1996, pps. 1723-1732.

U.S. Appl. No. 10/053,858, filed Jan. 19, 2002, Maksimovic et al.

U.S. Appl. No. 10/053,858, filed Jan. 19, 2002, Maksimovic et al.

U.S. Appl. No. 10/106,428, filed Mar. 26, 2002, Doyle et al.

U.S. Appl. No. 10/272,027, filed Oct. 15, 2002, Doyle et al.

Dragan Maksimovic, Bruno Kranzen, Sandeep Dhar and Ravindra Ambatipudi, U.S. Appl. No. 10/053,226, filed Jan. 19, 2002, entitled "An Adaptive Voltage Scaling Digital Processing Component and Method of Operating the Same".

Bruno Kranzen and Dragan Maksimovic, U.S. Appl. No. 10/053,227, filed Jan. 19, 2002, entitled "Adaptive Voltage Scaling Clock Generator for Use in a Digital Processing Component and Method of Operating the Same".

Dragan Maksimovic, Ravindra Ambatipudi, Sandeep Dhar and Bruno Krazen, U.S. Appl. No. 10/053,228, filed Jan. 19, 2002, entitled "An Adaptive Voltage Scaling Power Supply for Use in a Digital Processing Component and Method of Operating the Same".

Dragan Maksimovic and James Thomas Doyle, U.S. Appl. No. 10/166,822, filed Jun. 10, 2002, entitled "Serial Digital Communication Superimposed on a Digital Signal Over a Single Wire".

Dragan Maksimovic and Sandeep Dhar, U.S. Appl. No. 10/236,482, filed Sep. 6, 2002, entitled "Method and System for Providing Self-Calibration for Adaptively Adjusting a Power Supply Voltage in a Digital Processing System".

Wai Cheong Chan and Donald Kevin Cameron, U.S. Appl. No. 10/324,997, filed Dec. 18, 2002, entitled "System and Method for Signal Delay in an Adaptive Voltage Scaling Slack Detector".

Mark F. Rives, U.S. Appl. No. 10/246,971, filed Sep. 19, 2002, entitled "Power Supply System and Method That Utilizes an Open Loop Power Supply Control".

Jim Doyle and Bill Broach, Small Gains in Power Efficiency Now, Bigger Gains Tomorrow [online]. Jul. 9, 2002 [retrieved on Feb. 1, 2003]. Retrieved from the Internet: <URL: http://www.commsdesign.com/design_corner/OEG20020709S0022>. pps. 1-5.

Robert W. Erickson and Dragan Maksimovic, *Fundamentals of Power Electronics*, Second Edition, Kluwer Academic Publishers, 2001, pp. 333.

Krisztian Flautner, Steven Reinhardt and Trevor Mudge, Automatic Performance Setting for Dynamic Voltage Scaling, Wireless Networks, vol. 8, Issue 5, Sep. 2002, pps. 507-520, and Citation, pps. 1-3, [online]. [retrieved on Feb. 2, 2003]. Retrieved from the Internet: <URL: http://portal.acm.org/citation.cfm?id=582455.582463&coll=portal&dl=ACM&idx=J804&p . . . >.

Krisztian Flautner, Steven Reinhardt and Trevor Mudge, Automatic Performance Setting for Dynamic Voltage Scaling [online]. May 30, 2001, [retrieved on Feb. 2, 2003]. Retrieved from the Internet: <URL: http://www.eecs.urnich.edu/~tnm/papers/mobicom01.pdf>. pps. 1-12.

Texas Instruments, "Synchronous-Buck PWM Controller With NMOS LDO Controller", TPS5110, SLVS025A- Apr. 2002, Revised Jun. 2002.

Intel XScale Core, Developer's Manual, Dec. 2000, [online], [retrieved on Feb. 2, 2002]. Retrieved from the Internet: <URL: http://developer.intel.com/design/intelxscale/27347301.pdf>. pps. 1-1 through B-1.

* cited by examiner

POWER SUPPLY SYSTEM AND METHOD THAT PROVIDES A LOW-COST APPROACH TO VOLTAGE SCALING

BACKGROUND OF THE INVENTION

1. Field of the Invention

The present invention relates to voltage scaling and, more particularly, to a power supply system and method that provides a low-cost approach to voltage scaling.

2. Description of the Related Art

A DC power supply system is a circuit that provides a supply voltage and current to a load. Significant power savings can be obtained by changing the supply voltage in response to changes in the clock signal. This process, known as voltage scaling, corresponds with changes in the operational mode of the load.

For example, when a processor is performing intensive computations at the maximum clock speed, the supply voltage applied to the logic within the processor is sufficient to meet the timing requirements of the processor. When there are no further computations to be performed, the operational mode of the processor can be changed so that the processor is placed into a sleep mode where the frequency of the clock signal is dramatically lowered.

When the frequency of the clock signal is lowered, the period of the clock signal is increased. As a result, the magnitude of the supply voltage that is applied to the logic within the processor can be significantly lowered and still meet the timing requirements of the processor.

FIG. 11 shows a circuit diagram that illustrates a prior art DC power supply system 1100 that changes the supply voltage in response to changes in the clock signal. As shown in FIG. 11, power supply system 1100 includes a clock generator 1110 that outputs an input clock signal ICLK and a sample clock signal SCLK. In addition, the sample clock signal SCLK is a quadrature signal with respect to the input clock signal ICLK (is delayed 90° with respect to the input clock signal ICLK).

Power supply system 1100 also includes a propagation delay detector 1112 that detects the propagation delay of the input clock signal ICLK as clocked by the sample clock signal SCLK, and outputs a multi-bit propagation delay word PDW that identifies the measured propagation delay.

For example, propagation delay detector 1112 can include a number of substantially-equal, serially-connected delay blocks that have a corresponding series of outputs. The series of outputs form the inputs to a series of latches which are clocked by the sample clock signal SCLK.

In operation, the rising edge of the input clock signal ICLK is input to the first delay block of the series. The input clock signal ICLK propagates through each succeeding delay block in the series until the rising edge of the sample clock signal SCLK clocks each of the latches, thereby capturing the logic states at the outputs of the delay blocks.

Referring again to FIG. 11, power supply system 1100 also includes a changing clock frequency detector 1114 that receives the propagation delay word PDW from propagation detector 1112. In response, detector 1114 generates a binary word BW that represents changes in the propagation delay word PDW which, in turn, represent changes in the frequency of the input clock signal ICLK.

In addition, power supply system 1100 includes a pulse width modulator 1116 that outputs a pulse width modulated signal PWM where the widths of the pulses are defined by the values of the binary words BW that are output from changing clock frequency detector 1114.

Power supply system 1100 further includes a level shifter and high voltage driver 1120 that level shifts and outputs a voltage in response to the pulse modulated signal PWM. Driver 1120 includes a PMOS driver transistor 1122 that has a source connected to a voltage VDD, a drain connected to an inductor node NL, and a gate.

Driver 1120 also has an NMOS driver transistor 1124 that has a source connected to ground, a drain connected to inductor node NL, and a gate. Driver 1120 additionally includes a gate signal generator 1126 that receives the pulse width modulated signal PWM, and outputs non-overlapping gate signals G1 and G2 to PMOS transistor 1122 and NMOS transistor 1124, respectively.

In operation, when the pulse width modulated signal PWM transitions low, generator 1126 turns off NMOS transistor 1124 via gate signal G2, and then turns on PMOS transistor 1122 via gate signal G1. When PMOS transistor 1122 turns on, transistor 1122 sources current into inductor node NL.

When the pulse width modulated signal PWM transitions high, generator 1126 turns off PMOS transistor 1122 via gate signal G1, and then turns on NMOS transistor 1124 via gate signal G2. When NMOS transistor 1124 turns on, transistor 1124 provides a continuous conductive path to ground for inductor node NL.

As further shown in FIG. 11, power supply system 1100 also includes a filter 1130 that generates a DC voltage on a power node PN. Filter 1130 includes an inductor L that is connected to transistors 1122 and 1124 and the power node PN, and a capacitor C that is connected to the power node PN and ground.

The power node PN is connected, and provides a supply voltage, to a DC load, such as a microprocessor or memory. In addition, the power node PN is connected to the elements of power system 1100, with the exception of level shifter and high voltage driver 1120 (FIG. 11 only shows the power node PN connected to propagation delay detector 1112 for clarity).

Thus, power supply system 1100 provides a supply voltage and current to a power node that varies as the frequency of the clock signal varies. As noted above, by varying the supply voltage in response to variations in the clock signal, significant power savings can be realized.

One drawback of power supply system 1100 is that transistors 1122 and 1124 of level shifter and driver 1120 introduce noise into the supply voltage that results from transistors 1122 and 1124 switching off and on. This noise cannot be easily eliminated (spread spectrum techniques can mask the noise), and is intolerable in many radio applications such as cell phones.

Another drawback of power supply system 1100 is that system 1100 utilizes large, relatively-expensive, external components, such as a 10 uF capacitor and an even more costly 10 uH inductor, to implement filter 1130. In addition to a large size, inductors are another source of noise.

Filter 1130 can also be implemented with two capacitors (and without inductors). This approach, however, is less efficient, and only moderately less expensive than an LC filter. In addition, linear regulators, such as low-drop out regulators, can also be used, but are significantly more expensive.

Thus, there is a need for a low-cost approach to reducing the noise generated by the switching transistors, and providing a supply voltage and current to a power node that varies as the frequency of the clock signal varies.

DETAILED DESCRIPTION

As described in greater detail below, the power supply system of the present invention provides a supply voltage and current to a power node that varies as the frequency of the clock signal varies. The power supply system of the present invention is also fully compatible with conventional current-generation, deep, sub-micron (e.g., 0.08 micron) CMOS fabrication processes.

Figure 11:
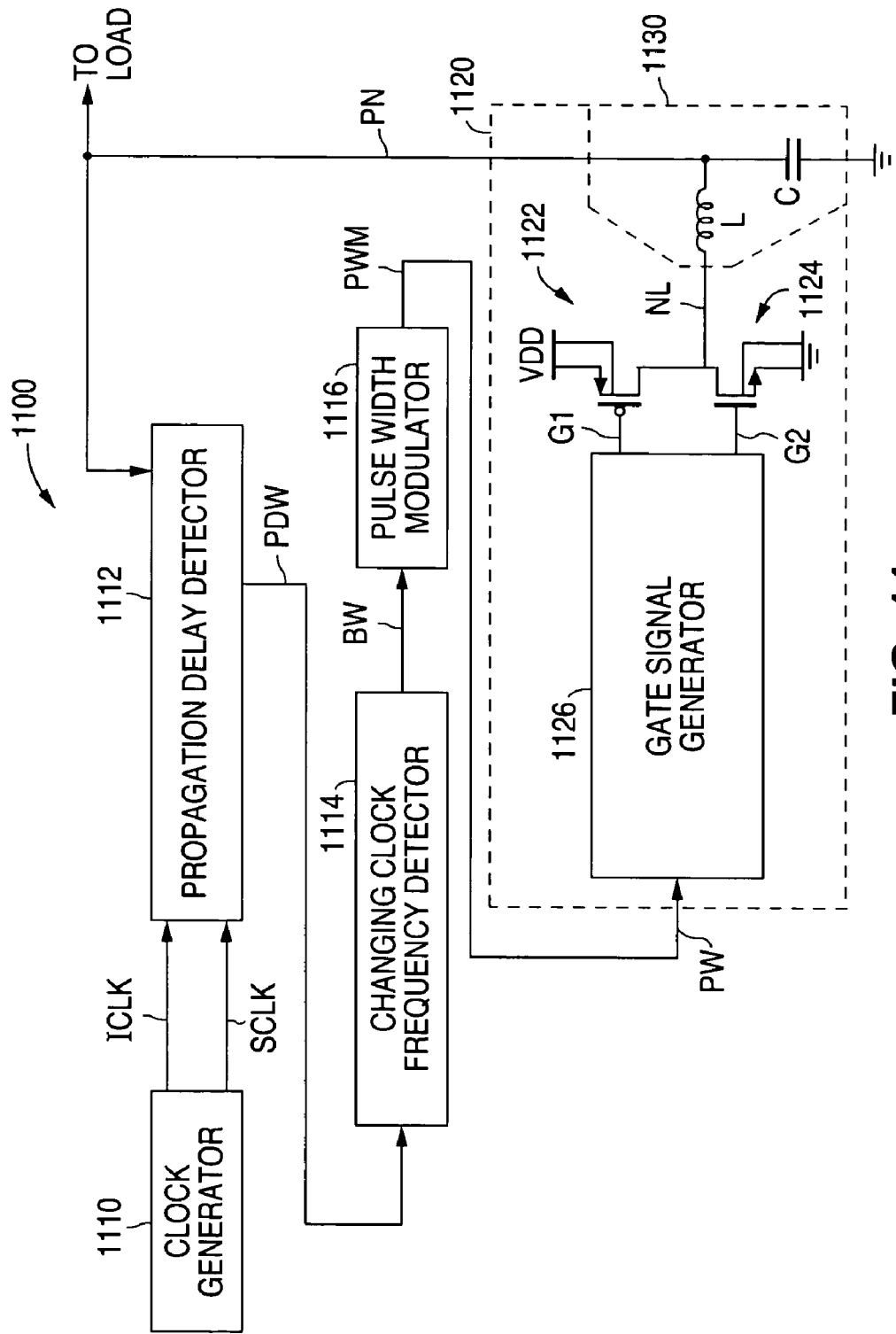
FIG. 11 is a circuit diagram illustrating a prior art DC power supply system 1100 that changes the supply voltage in response to changes in the clock signal.

In addition, the power supply system of the present invention eliminates the need for conventional switching transistors, such as transistors 1122 and 1124 shown in FIG. 11, thereby eliminating the switching noise associated with the switching transistors turning on and off.

By eliminating conventional switching transistors, the present invention also eliminates the need for a conventional filter, such as LC filter 1130. Further, when an inexpensive discrete current boosting stage, such as operational amplifier (op amp), is included in the system, the present invention provides a low-cost power supply system with a strong current drive.

Thus, by utilizing commonly available quad op amp packages, four independent power domains can be inexpensively controlled. For example, the current market price of a quad op amp package in volume is approximately $0.15US. (The price for a single op amp and a group of op amps, such as four, is essentially the same.)

As a result, by connecting four power supply circuits of the present invention to a discrete quad op amp package, the present invention provides a power supply system that provides control over four independent power domains that only requires one $0.15US external component.

By contrast, the current market prices for 10 uF capacitors and 10 uH inductors are approximately $0.20US-$0.30US each. As a result, a prior-art power supply system that provides control over a single independent power domain, such as power supply system 1100, costs approximately $0.50US just to provide the external LC filter.

Thus, a power supply system that controls four independent power domains costs approximately $2.00US just to provide the four external LC filters. The power supply circuit of the present invention is less efficient that some prior art power supply circuits, but provides a substantial savings in power for dramatically less cost ($0.15 vs. $2.00).

Figure 1:
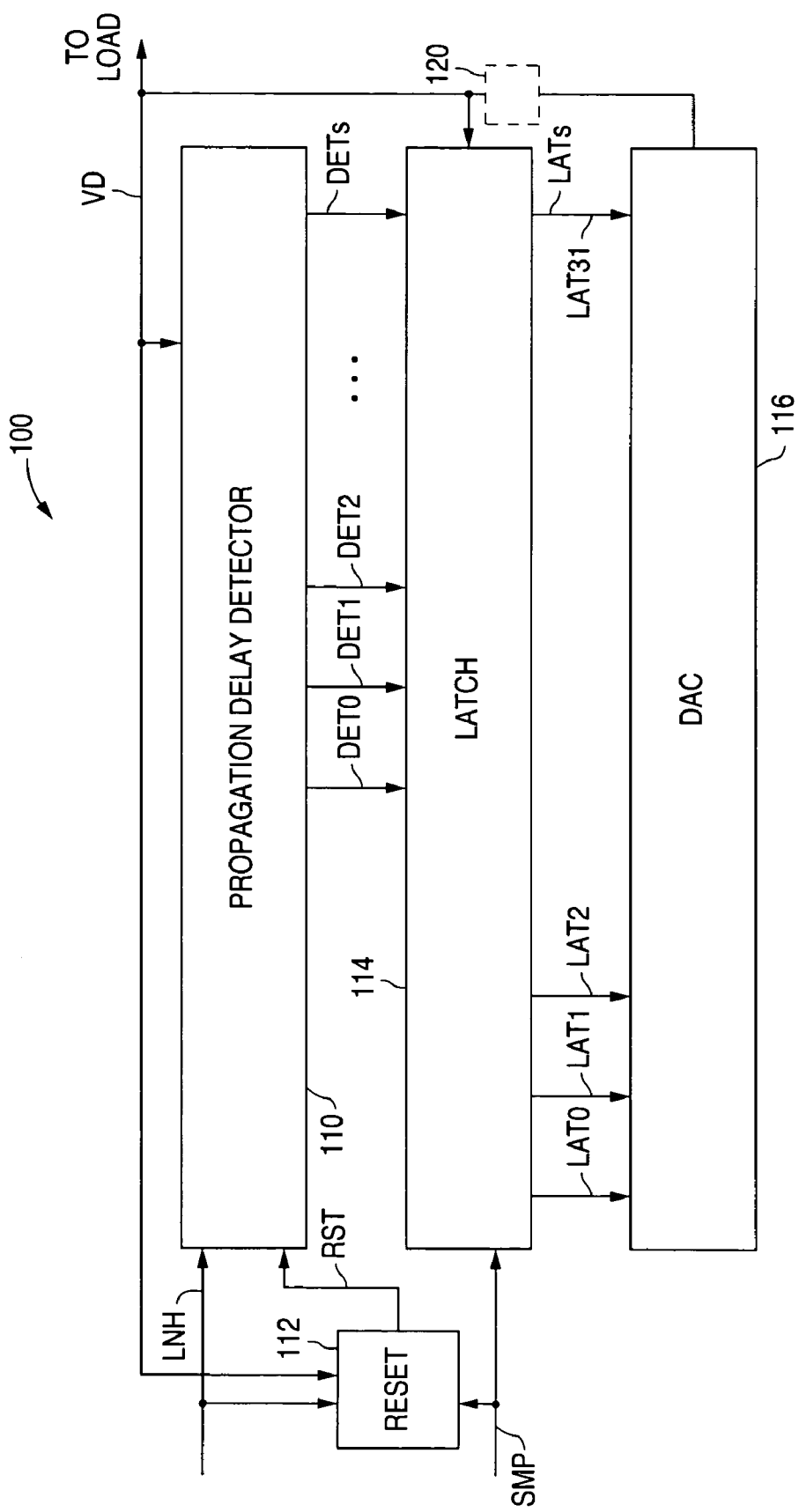
FIG. 1 is a block diagram illustrating an example of a power supply system 100 in accordance with the present invention.

FIG. 1 shows a block diagram that illustrates an example of a power supply system 100 in accordance with the present invention. As shown in FIG. 1, power supply system 100 includes a propagation delay detector 110 that measures the propagation delay of a launch signal LNH, and outputs a series of detection signals DET0–DETs that identifies the propagation delay. In the example shown in FIG. 1, the launch signal LNH is implemented with a 3.125 MHz clock signal which can be obtained, for example, by dividing a 12.5 MHz clock signal down by four.

Figure 2:
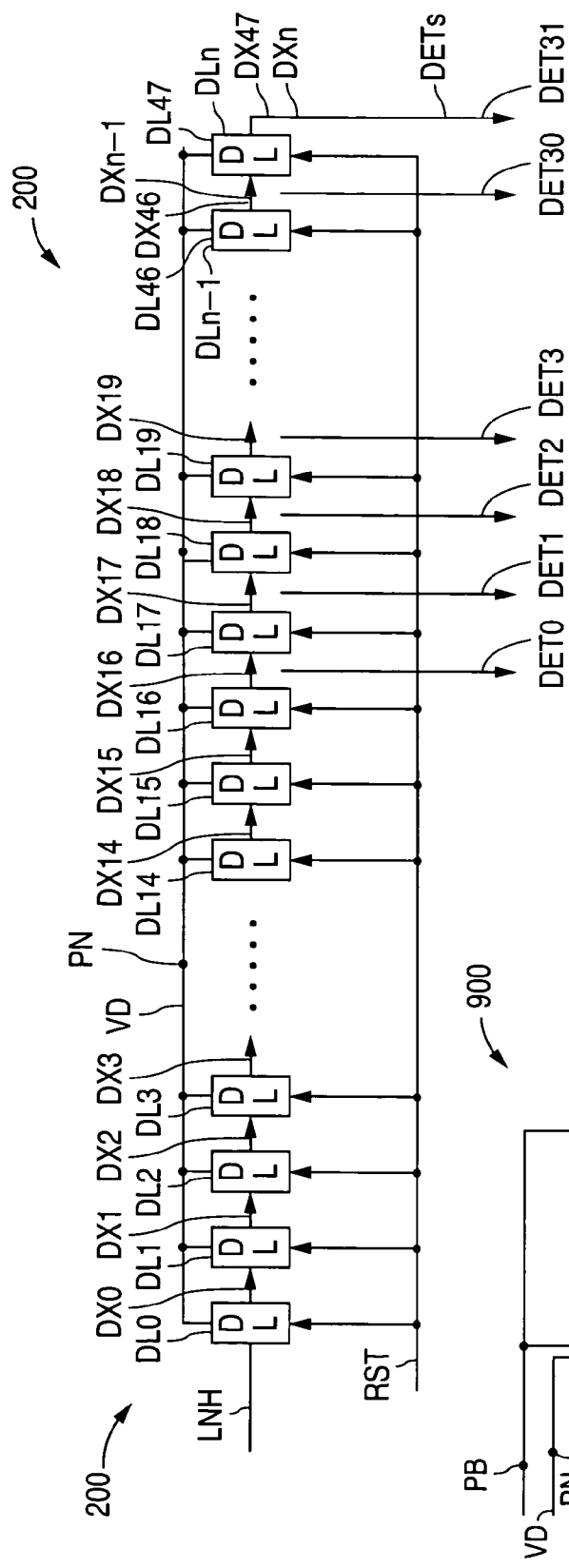
FIG. 2 is a circuit diagram illustrating an example of a propagation delay detector 200 in accordance with the present invention.

FIG. 2 shows a circuit diagram that illustrates an example of a propagation delay detector 200 in accordance with the present invention. As shown in FIG. 2, detector 200 includes a series of substantially equal delay blocks DL0–DLn that have a corresponding series of outputs DX0–DXn. Each delay block DL, in turn, is connected to a power node PN to receive a supply voltage VD. In the example shown in FIG. 2, detector 200 has 48 delay blocks DL0–DL47 that have 48 corresponding outputs DX0–DX47.

Detector 200 also takes the outputs DX from a subset of the total number of delay blocks DL0–DLn to generate the series of detection signals DET0–DETs. In the example shown in FIG. 2, detector 200 takes the outputs of the last 32 delay blocks DL16–DL47 to generate 32 detection signals DET0–DET31. (Outputs DX can alternately be taken from each delay block DL0–DLn.)

Figure 3:
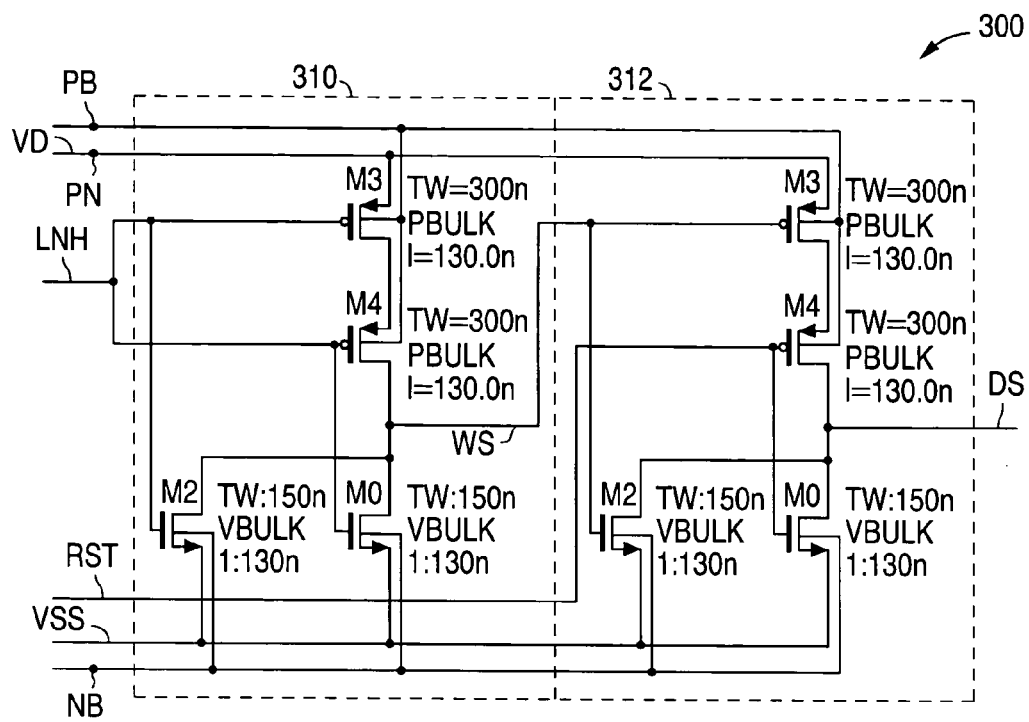
FIG. 3 is a circuit diagram illustrating an example of a delay block 300 in accordance with the present invention.

FIG. 3 shows a circuit diagram that illustrates an example of a delay block 300 in accordance with the present invention. As shown in the FIG. 3 example, delay block 300 is implemented with a NOR gate 310 and a NOR gate 312. NOR gate 310 has two inputs that are connected together to receive the launch signal LNH, and an output that outputs a NOR signal WS.

In addition, NOR gate 312 has an input that is connected to receive the NOR signal WS, an input that is connected to receive a reset signal RST, and an output that outputs a delayed signal DS. Further, NOR gates 310 and 312 are connected to power node PN to receive the supply voltage VD, a p-bulk node PB to receive a p-channel bulk voltage, ground VSS, and an n-bulk node NB to receive an n-channel bulk voltage.

In operation, NOR gate 310 outputs a logic high when the launch signal LNH is a logic low, and outputs a logic low when the launch signal LNH is a logic high. NOR gate 312, in turn, outputs the delayed signal DS with a logic high when NOR gate 310 outputs a logic low and the reset signal RST is a logic low, and outputs the delayed signal DS with a logic low when the reset signal RST is a logic high. Thus, when the reset signal RST goes high, the output of each delay block goes low.

Returning to FIG. 1, power supply system 100 also includes a reset circuit 112 that generates the reset signal RST in response to the launch signal LNH and a sample signal SMP. In the example shown in FIG. 1, the sample signal SMP is implemented with a clock signal that is a quadrature signal with respect to the launch signal LNH (is delayed 90° with respect to the launch signal LNH).

Figure 4:
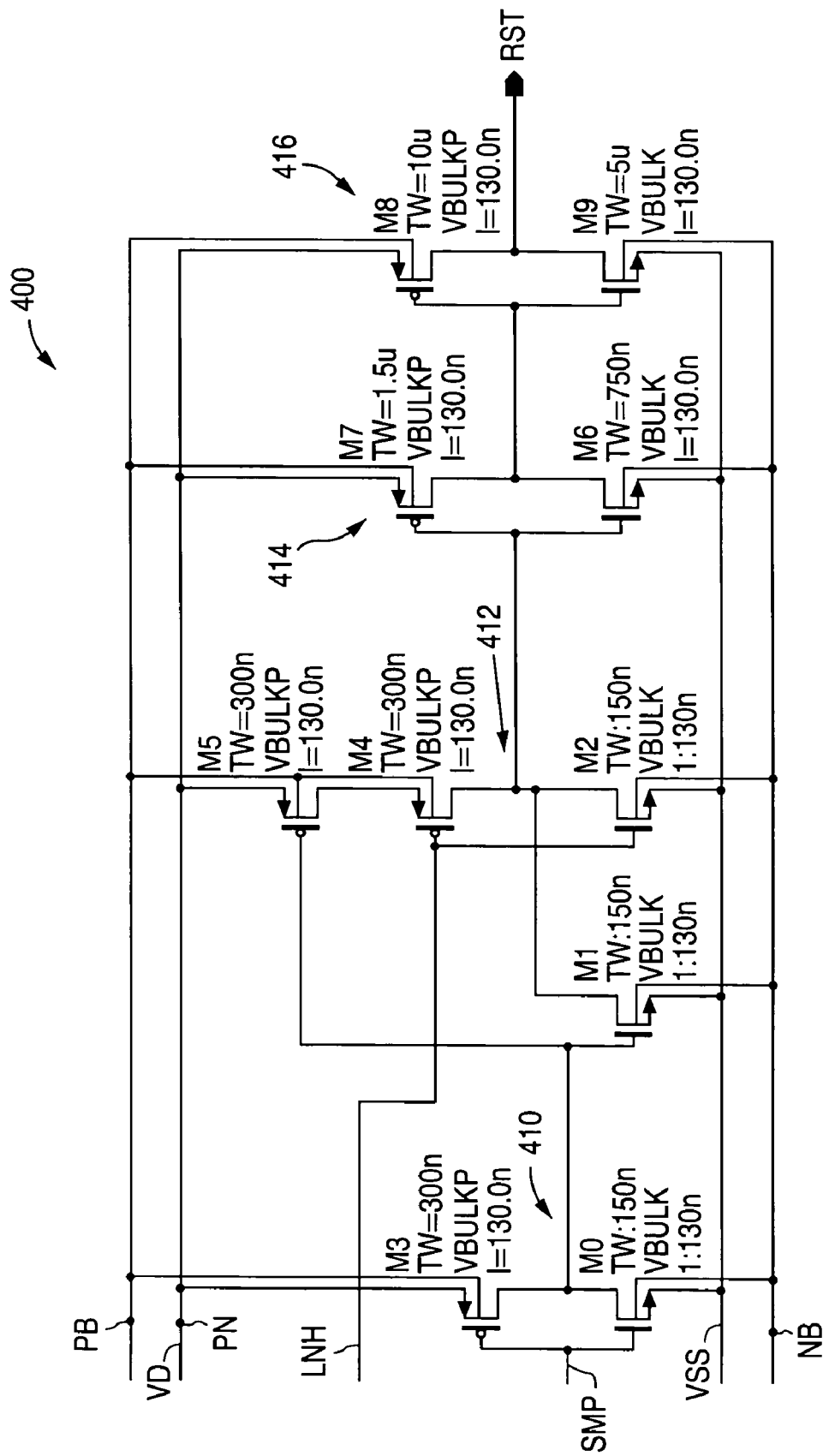
FIG. 4 is a circuit diagram illustrating a reset circuit 400 in accordance with the present invention.

FIG. 4 shows a circuit diagram that illustrates a reset circuit 400 in accordance with the present invention. As shown in FIG. 4, circuit 400 includes a first inverter 410 that has an input connected to receive the sample signal SMP, and a second inverter 412 that has an input connected to receive the launch signal LNH.

Reset circuit 400 also includes a third inverter 414 that has an input connected to the output of second inverter 412, and a fourth inverter 416 that has an input connected to the output of third inverter 414. In addition, inverter 416 has an output that outputs the reset signal RST. Inverters 410, 414, and 416 are connected to power node PN to receive the supply voltage VD, p-bulk node PB to receive the p-channel bulk voltage, ground VSS, and n-bulk node NB to receive the n-channel bulk voltage. Inverter 412, in turn, is connected to p-bulk node PB, n-bulk node NB, and ground VSS.

In addition, reset circuit 400 includes a PMOS transistor M5 that is connected between second inverter 412 and power node PN. Transistor M5 is also connected to the output of first inverter 410 and p-bulk node PB. Circuit 400 further includes a NMOS transistor M1 that is connected to second inverter 412 and ground VSS. Transistor M1 is also connected to the output of first inverter 410 and n-bulk node NB.

Figure 5A:
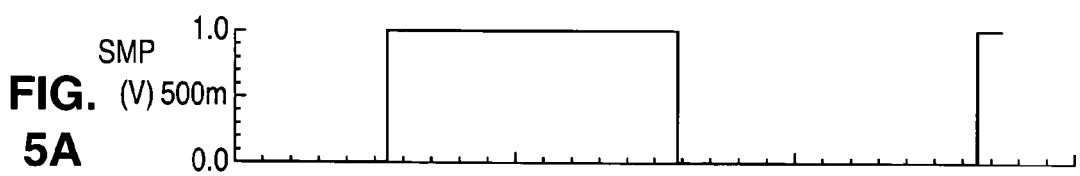
FIGS. 5A–5C are timing diagrams illustrating the operation of reset circuit 400 in accordance with the present invention.
Figure 5B:
Figure 5C:
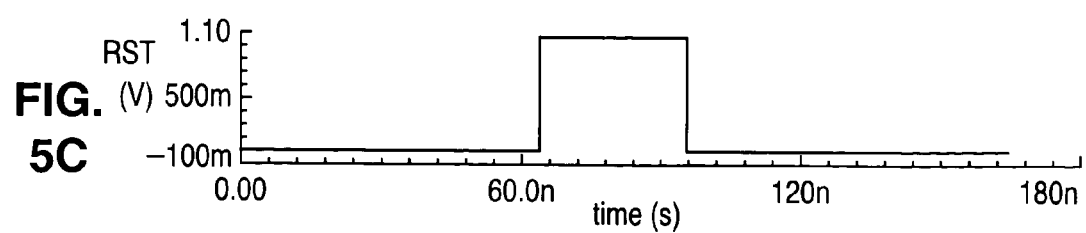

FIGS. 5A–5C show timing diagrams that illustrate the operation of reset circuit 400 in accordance with the present invention. As shown in FIGS. 4 and 5A–5C, when the sample signal SMP is low, transistor M5 is turned off while transistor M1 is turned on, thereby pulling the output of inverter 412 low. The logic low is inverted by inverters 414 and 416 to output the reset signal RST with a logic low.

When the sample signal SMP is high, transistor M5 is turned on while transistor M1 is turned off, thereby enabling inverters 412, 414, and 416. As a result, when the logic state of the launch signal LNH is high, the logic high is inverted by inverters 412, 414, and 416 to output the reset signal RST with a logic low.

When the launch signal LNH falls while the sample signal SMP is high, the falling edge is inverted by inverters 412, 414, and 416 to output the reset signal RST with a logic high. Thus, reset circuit 400 insures that the reset signal RST does not coincide with the sample signal SMP, i.e., the rising edge of the reset signal RST always follows the rising edge of the sample signal SMP. By insuring that the reset signal RST follows the sample signal SMP, a race condition between the sample signal SMP and the reset signal RST is eliminated.

Returning to FIG. 1, power supply circuit 100 also includes a latch circuit 114 that includes of series of latches that latch and output the logic states of the detection signals DET0–DETs as a series of latched signals LAT0–LATs in response to the sample signal SMP. As noted above, the sample signal SMP is a quadrature signal with respect to the launch signal LNH.

The frequency of the launch signal LNH defines the update timing of system 100 (how frequently values are latched). Thus, to meet the ripple requirement (and spur requirement) on the voltage output to a load, a launch signal frequency below a minimum value, such as 1 MHz, can be increased, such as with a phase-lock-loop (PLL), to insure that the frequency of the launch signal LNH is greater than the minimum value.

In addition, a launch signal frequency above a maximum value, such as 10 MHz, can be divided down, such as with a clock divider, to insure that the frequency of the launch signal LNH falls within the minimum and maximum values. A frequency that is greater than the maximum value may reduce quantization ripple, but at the expense of efficiency and power savings. (Spread spectrum techniques may be required to minimize higher frequency update clocks.)

In the present example, latch circuit 114 includes 32 latches that latch the logic states that are output from delay blocks DL16–DL47 as latched signals LAT0–LAT31. The logic states of the latched signals LAT0–LAT31 represent a thermometer code such as, for example, 1111 1111 1111 1111 0000 0000 0000 0000, that indicates how far the launch signal LNH propagated through the delay blocks DL before the sample signal SMP latched the outputs of the delay blocks DL.

Figure 6A:
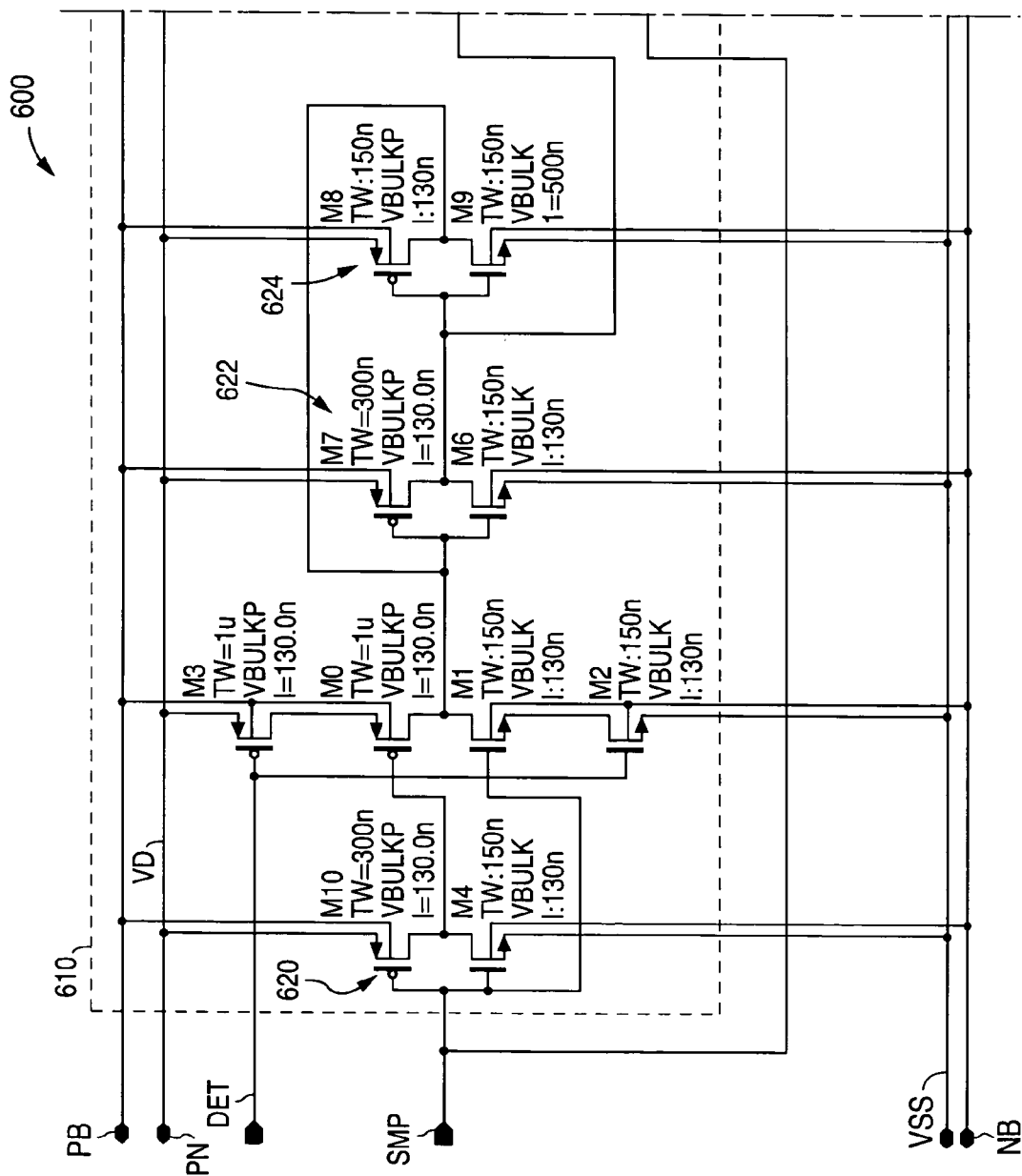
FIGS. 6A and 6B are circuit diagrams illustrating an example of a latch 600 in accordance with the present invention.
Figure 6B:
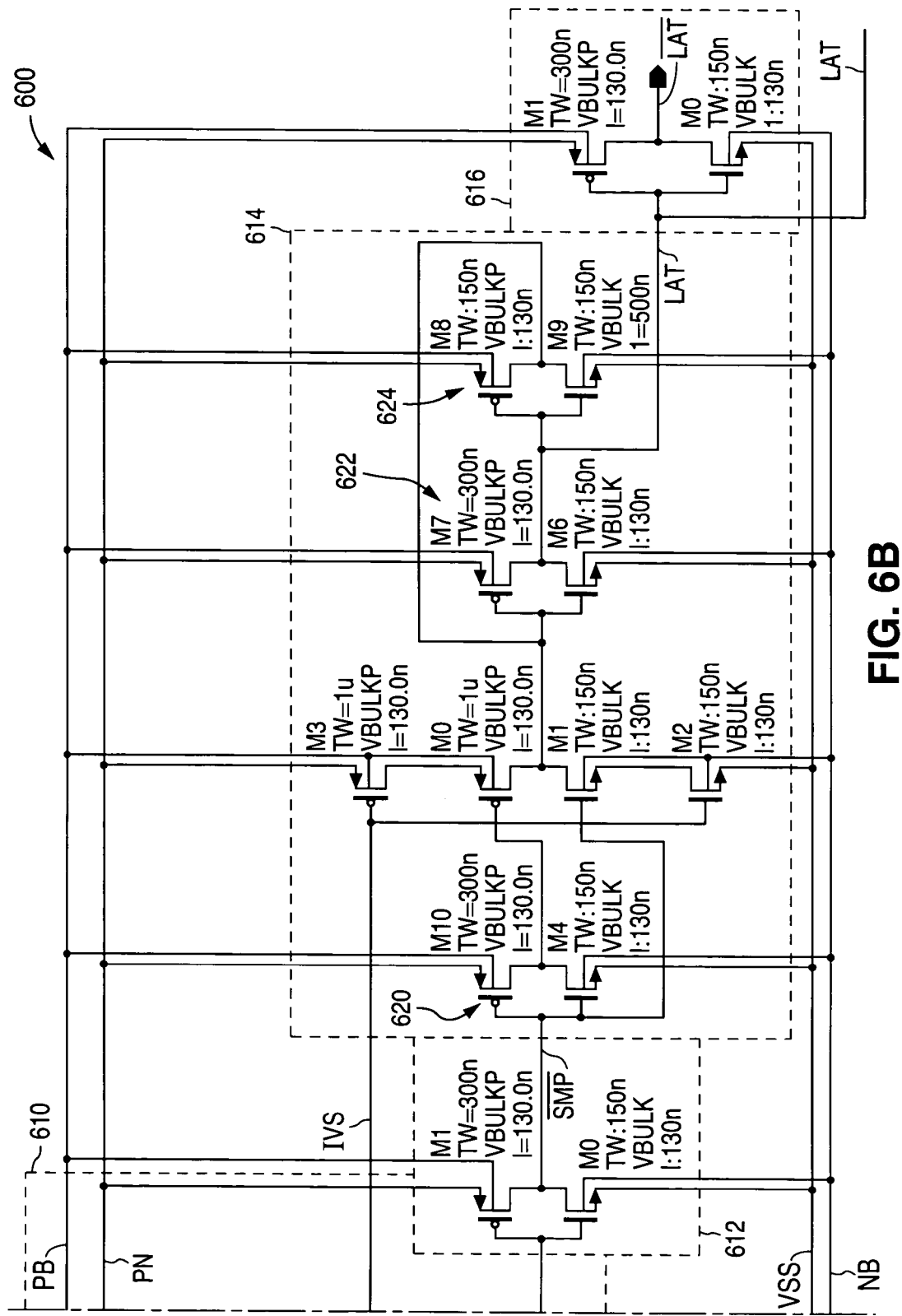

FIGS. 6A and 6B show a circuit diagram that illustrates an example of a latch 600 in accordance with the present invention. As shown in FIGS. 6A and 6B, latch 600 includes a jam latch 610, an inverter 612, and a jam latch 614 that is connected to inverter 612. In addition, latch 600 can also include an inverter 616 that is connected to jam latch 614.

As further shown in FIGS. 6A and 6B, jam latches 610 and 614 both include a first inverter 620. Inverter 620 of latch 610 has an input connected to receive the sample signal SMP, while inverter 620 of latch 614 has an input connected to receive an inverted sample signal SMPbar. Inverter 612, in turn, inverts the sample signal SMP to form the inverted sample signal SMPbar. As a result, latch 610 operates during a first half period of the sample signal SMP, while latch 614 operates during a second half period of the sample signal SMP.

As additionally shown in FIGS. 6A and 6B, jam latches 610 and 614 both include a second inverter 622 that has an input and an output, and a third inverter 624 that has an input connected to the output of inverter 622, and an output that is connected to the input of inverter 622. Inverters 620, 622, and 624 are connected to power node PN to receive supply voltage VD, p-bulk node PB to receive the p-channel bulk voltage, ground VSS, and n-bulk node NB to receive the n-channel bulk voltage.

In addition, jam latches 610 and 614 both include a PMOS transistor M3 that has a source connected to power node PN, a drain, and a bulk connected to p-bulk node PB. Transistor M3 of latch 610 has a gate connected to receive a detection signal DET, while transistor M3 of latch 614 has a gate connected to receive the output of latch 610. Jam latches 610 and 614 also both include a PMOS transistor M0 that has a source connected to the drain of transistor M3, a drain connected to second inverter 622, a gate connected to the output of first inverter 620, and a bulk connected to p-bulk node PB.

Further, jam latches 610 and 614 both include a NMOS transistor M1 that has a source, a drain connected to second inverter 622, and a bulk connected to n-bulk node NB. Transistor M1 of latch 610 has a gate connected to receive the sample signal SMP, while transistor M1 of latch 614 has a gate connected to receive the inverted sample signal SMPbar.

In addition, jam latches 610 and 614 both include a NMOS transistor M2 that has a source connected to ground, a drain connected to the source of transistor M1, and a bulk connected to the n-bulk node NB. Transistor M2 of latch 610 has a gate connected to receive the detection signal DET, while transistor M2 of latch 614 has a gate connected to receive the output of latch 610.

In operation, when the sample signal SMP has a logic low, inverter 620 of latch 610 outputs a logic high that turns off transistor M0, while transistor M1 is directly turned off by the sample signal SMP. This, in turn, isolates transistors M2 and M3. When the sample signal SMP goes high, inverter 620 outputs a logic low that turns on transistor M0, while transistor M1 is directly turned on by the sample signal SMP.

As a result, transistors M3/M0 and M2/M1 invert the logic state of the detection signal DET. The inverted detection signal is inverted again by inverter 622 and output as an inverted signal IVS, and inverted and fed back to inverter 622 by inverter 624. As a result, the logic state of the detection signal DET is output as the inverted signal IVS on the rising edge of the sample signal SMP.

When the inverted sample signal SMPbar has a logic low, inverter 620 of latch 614 outputs a logic high that turns off transistor M0, while transistor M1 is directly turned off by the inverted sample signal SMPbar. This, in turn, isolates transistors M2 and M3 of latch 614. When the inverted sample signal SMPbar goes high, inverter 620 outputs a logic low that turns on transistor M0, while transistor M1 is directly turned on by the inverted sample signal SMPbar.

As a result, transistors M3/M0 and M2/M1 of latch 614 invert the logic state of the inverted signal IVS. The inverted signal IVS is inverted again by inverter 622 and output as a latched signal LAT, and inverted and fed back to inverter 622 by inverter 624. As a result, the logic state of the inverted signal IVS is output as a latched signal LAT on the rising edge of the inverted sample signal SMPbar. In addition, inverter 616 can be used to invert the latched signal LAT to output an inverted latched signal LATbar that has a logic state opposite to the logic state of the detection signal DET.

Latch 600 is known as a cheater D flip flop because inverter 612 is used to overdrive jam latch 614 (care must be taken to insure that the drive is sufficient to overdrive latch 614). One of the advantages of using latch 600 is that latch 600 is free of any transmission gates. In low voltage conditions, transmission gates have significantly different performance than logic gates, such as NOR gates (transmission gates tend to have a high impedance state rather than a hard turn on state and a hard turn off state).

Thus, by utilizing logic gates rather than transmission gates, latch 600 provides improved performance in low voltage conditions. In addition, the logic gates used in latch 600 are similar to NOR gates. As a result, latch 600 responds to changes in process, voltage, and temperature (PVT) in substantially the same way as the NOR gates used in propagation delay detector 110.

As further shown in FIG. 1, power supply system 100 additionally includes a string DAC 116 that generates the voltage VD on power node PN in response to the logic states of the series of latched signals LAT0–LAT31. As a result, the DC voltage generated by DAC 116 provides the supply voltage VD to propagation delay detector 110, reset circuit 112, and latch 114.

Propagation delay detector 110, reset circuit 112, latch 114, and DAC 116 can be on the same or different chips. For example, DAC 116 can be located on a first chip that provides a number of functions, or on a power management chip that is used to manage the power consumed by the first chip. In these examples, a digital interface is not required.

Figure 7:
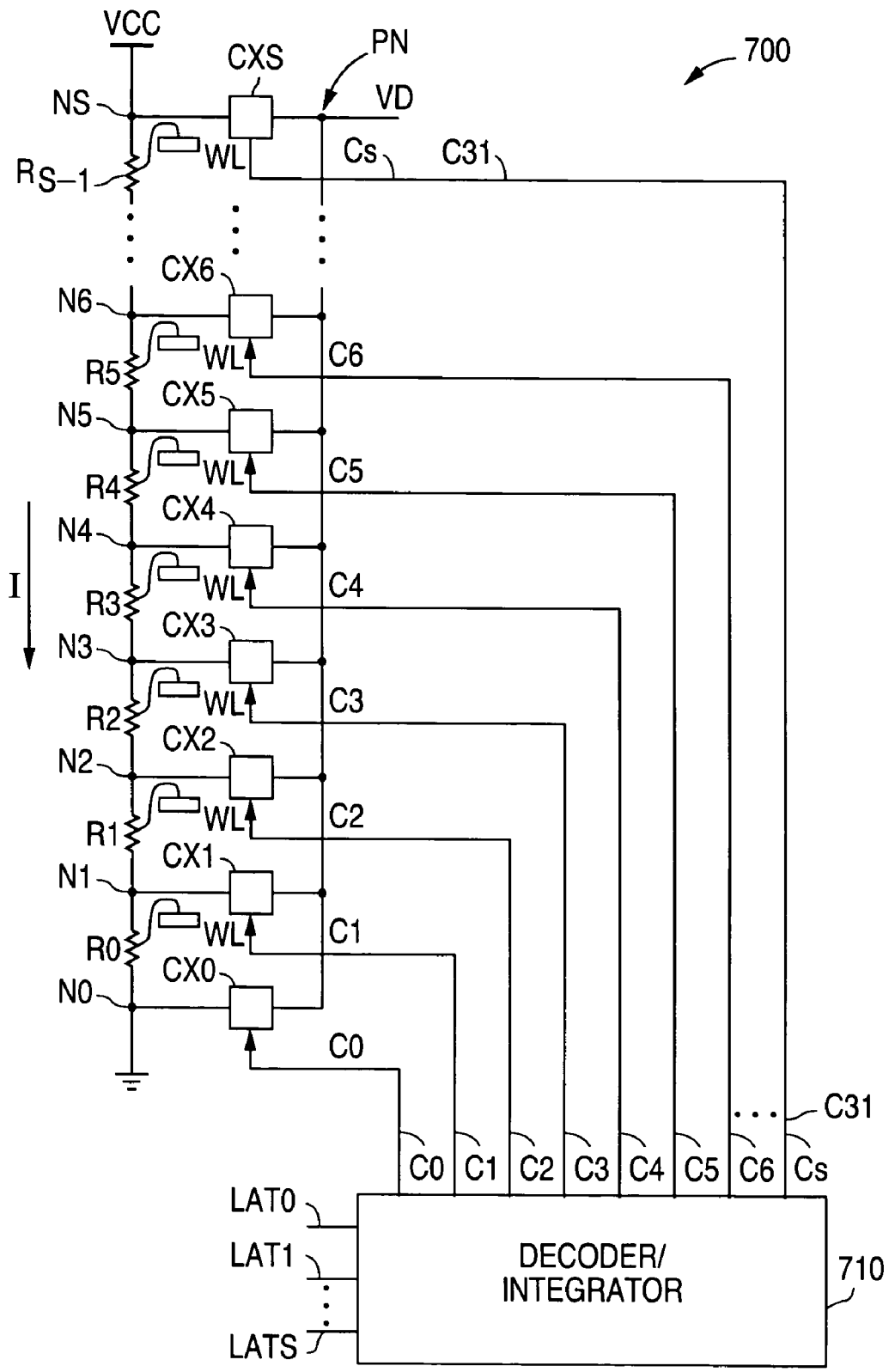
FIG. 7 is a block and schematic diagram illustrating a string DAC 700 in accordance with the present invention.

FIG. 7 shows a block and schematic diagram that illustrates a string DAC 700 in accordance with the present invention. As shown in FIG. 7, DAC 700 includes a decoder/integrator circuit 710 that detects the logic high to logic low transitions of the thermometer codes identified by the logic states of the latched signals LAT0–LATs to generate a series of edge words that identifies the falling edge. In addition, circuit 710 integrates a number of edge words to generate a series of control signals C0–Cs so that only one of the control signals C has a logic high. In the FIG. 7 example, decoder/integrator circuit 710 generates 32 control signals C0–C31.

The logic high to logic low transition of a thermometer code can be detected by using a series of exclusive OR (XOR) gates that equal the number of bits in the thermometer code such that the first XOR gate XORs the logic states of the first and second latched signals LAT0 and LATl1, and the second XOR gate XORs the logic state of the second and third latched signals LAT1 and LAT2.

For example, for a four bit thermometer code of 1100, four XOR gates are utilized. In this case, the first XOR gate XORs the 11 to output a logic low, and the second XOR gate XORs the 10 to output a logic high. In addition, the third XOR gate XORs the 00 to output a logic low, and the fourth XOR gate XORs the 0 and a permanently fixed logic zero to output a logic zero. As a result, the four bit thermometer code of 1100 is decoded into a four bit edge word of 0100. The last input of the last XOR gate is permanently tied to a logic low to insure that a logic high to logic low transition is always detected.

Figure 8:
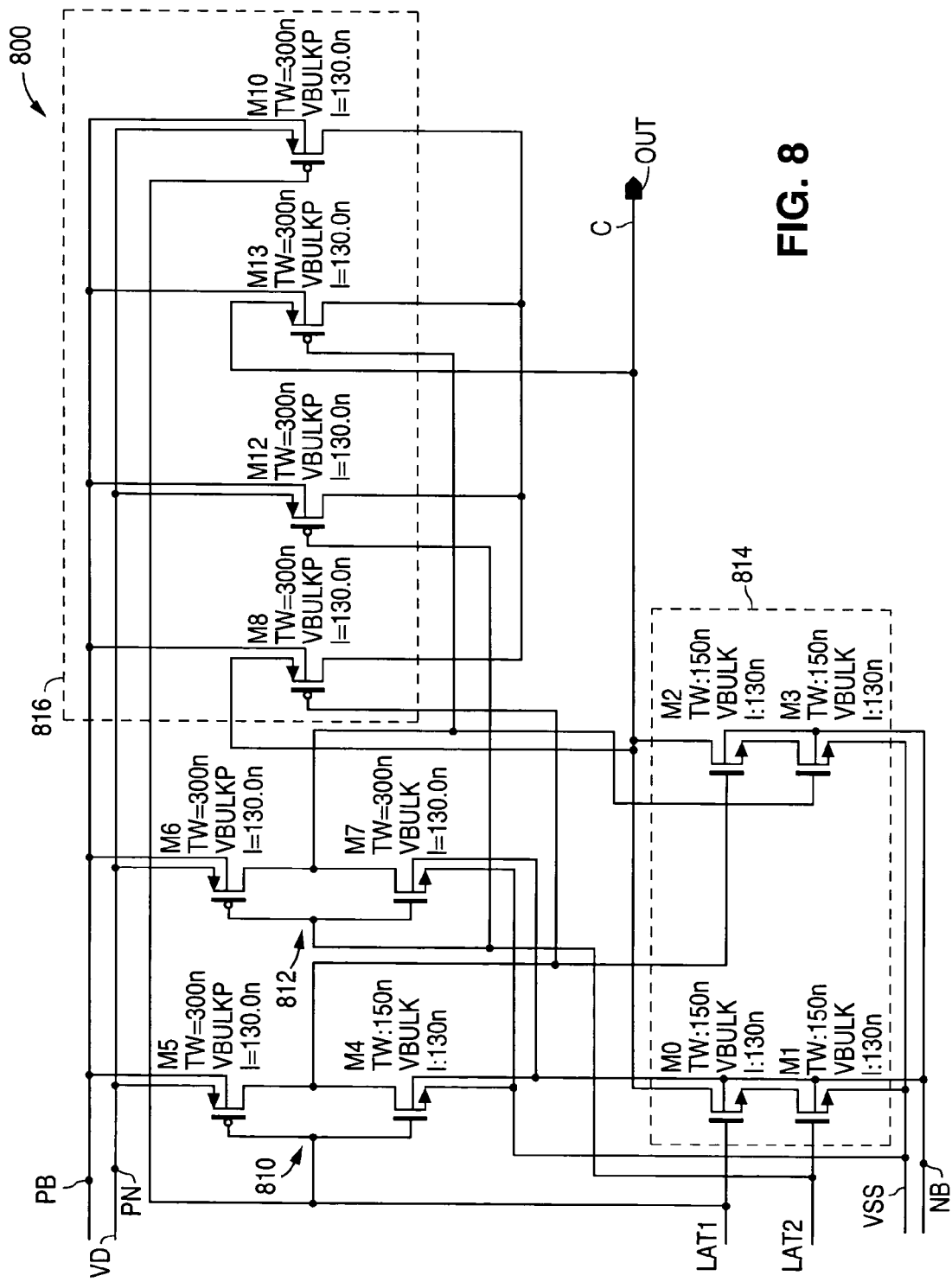
FIG. 8 is a circuit diagram illustrating an example of a latch 800 in accordance with the present invention.

FIG. 8 shows a circuit diagram that illustrates an example of an XOR gate 800 in accordance with the present invention. As shown in FIG. 8, gate 800 includes an inverter 810, an inverter 812, a pull down circuit 814, and a pull up circuit 816. Inverter 810 has an input connected to receive a first latched signal LAT1, while inverter 812 has an input connected to receive a second latched signal LAT2. Further, inverters 810 and 812 are connected to power node PN to receive the supply voltage VD, p-bulk node PB to receive the p-channel bulk voltage, ground VSS, and n-bulk node NB to receive the n-channel bulk voltage.

Pull down circuit 814 includes an NMOS transistor M0 that has a source, a drain connected to an out put node OUT, a gate connected to the first latched signal LAT1, and a bulk connected to n-bulk node NB, and an NMOS transistor M1 that has a source connected to ground VSS, a drain connected to the source of transistor M0, a gate connected to the second latched signal LAT2, and a bulk connected to n-bulk node NB. The signal on the output node OUT represents a bit of an edge word.

Pull down circuit 814 also includes an NMOS transistor M2 that has a source, a drain connected to output node OUT, a gate connected to the output of inverter 810, and a bulk connected to n-bulk node NB, and an NMOS transistor M3 that has a source connected to ground VSS, a drain connected to the source of transistor M2, a gate connected to the output of inverter 812, and a bulk connected to n-bulk node NB.

Pull up circuit 816 includes a PMOS transistor M8 that has a source connected to output node OUT, a drain, a gate connected to the output of inverter 810, and a bulk connected to p-bulk node PB, and an PMOS transistor M12 that has a source connected to supply voltage VD, a drain connected to the drain of transistor M8, a gate connected to the second latched signal LAT2, and a bulk connected to p-bulk node PB.

Pull up circuit 816 also includes a PMOS transistor M13 that has a source connected to output node OUT, a drain connected to the drains of transistors M8 and M12, a gate connected to the output of inverter 812, and a bulk connected to p-bulk node PB, and an PMOS transistor M10 that has a source connected to supply voltage VD, a drain connected to the drain of transistors M8, M12, and M13, a gate connected to the first latched signal LAT1, and a bulk connected to p-bulk node PB.

In operation, when the logic states of latched signals LAT1 and LAT2 are both high, transistors M0 and M1 both turn on, thereby pulling the voltage on the output node OUT to ground. When the logic states of latched signals LAT1 and LAT2 are both low, the outputs of inverters 810 and 812 turn on transistors M2 and M3, thereby pulling the voltage on the output node OUT to ground.

When the logic state of latched signal LAT1 is a logic low and the logic state of latched signal LAT2 is a logic high, transistors M0 and M3 are turned off, while transistors M10 and M13 are turned on, thereby pulling the voltage on the output node OUT to the supply voltage.

When the logic state of latched signal LAT1 is a logic high and the logic state of latched signal LAT2 is a logic low, transistors M1 and M2 are turned off, while transistors M8 and M12 are turned on, thereby pulling the voltage on the output node OUT to the supply voltage. One of the advantages of XOR gate 800 is that gate 800 is free of transmission gates which, as noted above, operate differently that logic gates under low voltage conditions.

Referring again to FIG. 7, the integrator portion of decoder/integrator circuit 710 can be implemented with, for example, a pair of registers to hold a current edge word and a previous edge word, an averaging circuit that averages the two edge words, and an output circuit that outputs one of a series control signals CX0–Cxs that corresponds with the average value of the two edge words.

As further shown in FIG. 7, DAC 700 also includes a series of transmission circuits CX0–CXs that are connected to decoder/integrator circuit 710 to receive the control signals C0–Cs. In addition, the transmission circuits CX0–CXs are also connected to power node PN and a series of resistor nodes N0–Ns.

Figure 9:
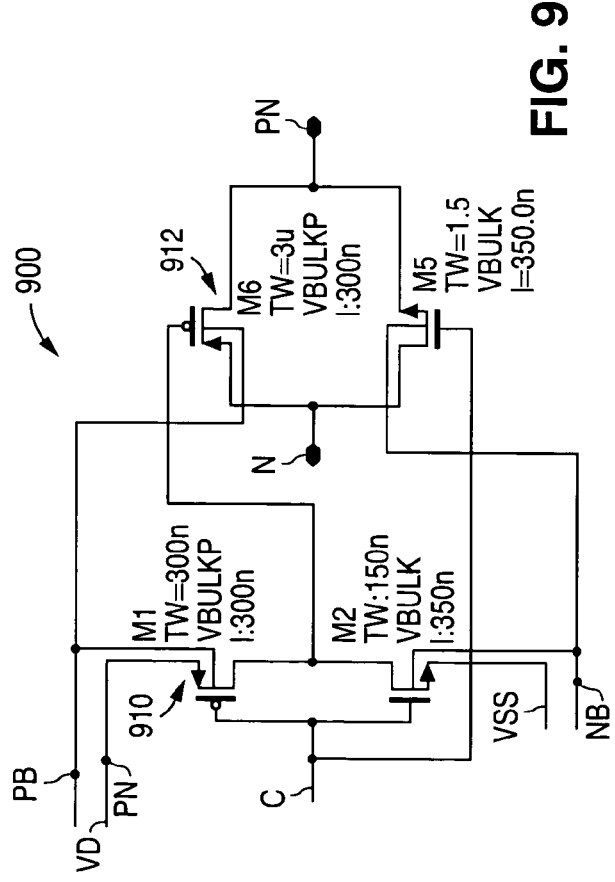
FIG. 9 is a circuit diagram illustrating an example of a transmission circuit 900 in accordance with the present invention.

FIG. 9 shows a circuit diagram that illustrates an example of a transmission circuit 900 in accordance with the present invention. As shown in FIG. 9, transmission circuit 900 includes an inverter 910 that has an input connected to receive a control signal C, and an output. Inverter 910 is connected to power node PN to receive the supply voltage VD, p-bulk node PB to receive the p-channel bulk voltage, ground VSS, and n-bulk node NB to receive the n-channel bulk voltage.

As further shown in FIG. 9, circuit 900 also includes a transmission gate 912 that has a first input connected to receive the control signal C and a second input connected to the output of inverter 910. In addition, transmission gate 912 also includes a third input connected to a resistor node N, and an output connected to power node PN. Transmission gate 912 is also connected to p-bulk node PB to receive the p-channel bulk voltage, and n-bulk node NB to receive the n-channel bulk voltage.

In operation, when the logic state of the control signal C is low, the control signal C and the output of inverter 910 turn off transmission gate 912, thereby isolating the voltage on resistor node N from the voltage on power node PN. On the other hand, when the logic state of the control signal C is high, the control signal C and the output of inverter 910 turn on transmission gate 912, thereby passing the voltage on resistor node N to power node PN.

Returning to FIG. 7, DAC 700 also includes a resistor string that has series of resistors R0 to Rs-1 that are connected to the resistor nodes N0–Ns between a power supply voltage VCC and ground such that each resistor R is connected between a pair of adjacent resistor nodes N. (Alternate resistor connection schemes can also be used.) In the present example, the power supply voltage VCC is separate from the supply voltage VD, and can be formed from, for example, an I/O voltage.

Further, as illustrated in FIG. 7, resistors R0 to Rs-1 can be formed in a well structure WL, such as a single well (e.g., an n-type resistor in a p-well), a double well, or a triple well, to isolate and alter the operating characteristics (e.g., improve the noise characteristics) of the resistors R0 to Rs-1.

In addition, the resistors R0 to Rs-1 can be formed in a serpentine or interdigitated fashion to minimize the effects of local hot spots, process gradients, or similar conditions on the surface of the die. In operation, a current I flows from resistor Rs-1 to resistor R0, thereby generating a voltage step at each resistor node N (that is not directly connected to a voltage, such as VCC and ground).

When the resistor string is formed in a deep sub-micron fabrication process, relatively high resistor values, e.g., $2K\omega$–$4K\omega$ per square, can be realized. Due to these high resistor values, the current flowing through the string is relatively small. Thus, one of the advantages of the resistor string is that the string consumes very little power.

In operation, decoder/integrator circuit 710 changes the logic state of only one of the control signals C0–Cs to a logic high in response to the logic states of the latched signals LAT0–LATs. As a result, the transmission circuit CX that receives the control signal C turns on, electrically connecting a resistor node N to power node PN.

For example, when decoder/integrator circuit 710 outputs control signal C4 with a logic high (while the remaining control signals have a logic low), transmission circuit CX4 connects resistor node N4 to power node PN. As a result, the resistors generate a DC voltage on resistor node N4 that is output as the supply voltage VD.

Referring to FIGS. 1, 2, 5, and 7, power supply system 100 operates propagation delay detector 110 and latch circuit 112 together to measure the propagation delay of the launch signal LNH as clocked by the sample signal SMP. As shown in FIG. 2, the rising edge of the launch signal LNH is input to the first delay block DL0 of the series.

The launch signal LNH propagates through each succeeding delay block DL in the series causing the outputs DX0–DXn of the delay blocks DL0–DLn to sequentially output a logic high. When the rising edge of the sample signal SMP is generated, the rising edge clocks each of the latches in latch circuit 114, thereby latching the logic states on the outputs DX16–DX47. The reset signal RST then resets the delay blocks DL in propagation delay detector 110.

When the supply voltage VD is set to consume minimum power for a frequency of the launch signal LNH, the rising edge of the launch signal LNH propagates through 32 delay blocks before the rising edge of the sample signal SMP clocks the latches. This, in turn, causes the first 32 delay blocks DL0–DL31 to output a logic high, while the last 16 delay blocks DL32–DL47 output a logic low (because the rising edge of the launch signal LNH did not propagate any further than delay block DL31 before the sample signal SMP clocked the latches).

As further noted above, the latches in latch circuit 114 are connected to outputs DX16–DX47. As a result, when the rising edge of the launch signal LNH propagates through 32 delay blocks, the first 16 latches latch the logic high output from delay blocks DX16–DX31 while the last 16 latches latch a logic low that is output from delay blocks DX32–DX47.

Thus, in the present example, propagation delay detector 110 outputs a 32-bit thermometer code of 16 highs followed by a pattern of 16 lows (1111 1111 1111 1111 0000 0000 0000 0000) when the supply voltage VD is set to consume minimum power for the frequency of the launch signal LNH. In addition, as shown in FIGS. 5A–5C, after the thermometer code output from propagation delay detector 110 has been latched, the reset signal RST resets each of the delay blocks DL0–DLn.

Decoder/Integrator 710 of DAC 700 then detects the logic high to logic low transition of the thermometer code latched by latch circuit 114 to generate a series of 32-bit edge words, and then integrates a number of edge words (which are assumed to be the same at this point) to output the control signals C0–C31 so only control signal C15 (the 16$^{th}$ bit) has a logic high (0000 0000 0000 0001 0000 0000 0000 0000). This turns on control circuit CX15 which passes the voltage on resistor node N15 to generate the supply voltage VD.

When the frequency of the launch signal LNH decreases, the rising edge of the launch signal LNH passes through more delay blocks DL before the rising edge of the sample signal SMP latches the values. The rising edge passes through more delay blocks DL because the period of the launch signal LNH is now longer.

This, in turn, causes the first, for example, 40 delay blocks DL0–DL39 to output a logic high, while the last 8 delay blocks DL40–DL47 output a logic low. As a result, when the rising edge of the launch signal LNH propagates through 40 delay blocks, the first 24 latches latch the logic high output from delay blocks DX16–DX39 while the last 8 latches latch a logic low that is output from delay blocks DX40–DX47.

In this example, propagation delay detector 110 outputs a 32-bit thermometer code of 24 highs followed by a pattern of 8 lows (1111 1111 1111 1111 1111 1111 0000 0000). As above, after the thermometer code output from propagation delay detector 110 has been latched, the reset signal RST resets each of the delay blocks DL0–DLn.

Decoder/Integrator circuit 710 of DAC 700 then detects the logic high to logic low transition of the thermometer code latched by latch circuit 114, and integrates the latched thermometer code to output the control signals C0–C31. For example, when the frequency of the launch (clock) signal LNH changes from a first frequency to a second frequency, circuit 710 can average the last edge word that represents the first frequency and the first edge word that represents the second frequency.

The result of the integrating/averaging causes only one control signal, such as control signal C8 to have a logic high. This turns on control circuit CX8 which passes the voltage on resistor node N8 to lower the supply voltage VD. The lowered supply voltage VD slows down the operation of the delay blocks DL which, in turn, causes the thermometer code to fall.

For example, supply voltage VD can drop such that propagation delay detector 110 outputs a 32-bit thermometer code of 22 highs followed by a pattern of 10 lows (1111 1111 1111 1111 1111 1100 0000 0000). As above, after the thermometer code output from propagation delay detector 110 has been latched, the reset signal RST resets each of the delay blocks DL0–DLn.

Decoder/Integrator circuit 710 of DAC 700 again detects the logic high to logic low transition of the thermometer code, and integrates the latched thermometer code to output the control signals C0–C31. The result of the integrating/averaging causes only one control signal, such as control signal C4 to have a logic high. This turns on control circuit CX4 which passes the voltage on resistor node N4 to further lower the supply voltage VD.

The further lowered supply voltage VD further slows down the operation of the delay blocks DL which, in turn, causes the thermometer code to again fall. This process continues until the supply voltage VD reaches a steady state point (although some oscillation may be present) defined by the gain of the loop which, in turn, can be defined by the number of steps and the size of the steps of DAC 700.

When the frequency of the launch signal LNH increases, the rising edge of the launch signal LNH passes through fewer delay blocks DL before the rising edge of the sample signal SMP latches the values. The rising edge passes through fewer delay blocks DL because the period of the launch signal LNH is now shorter.

This, in turn, causes the first, for example, 24 delay blocks DL0–DL23 to output a logic high, while the last 22 delay blocks DL24–DL47 output a logic low. As a result, when the rising edge of the launch signal LNH propagates through 24 delay blocks, the first 8 latches latch the logic high output from delay blocks DX16–DX23 while the last 24 latches latch a logic low that is output from delay blocks DX24–DX47.

In this example, propagation delay detector 110 outputs a 32-bit thermometer code of 8 highs followed by a pattern of 24 lows (1111 1111 0000 0000 0000 0000 0000 0000). As above, after the thermometer code output from propagation delay detector 110 has been latched, the reset signal RST resets each of the delay blocks DL0–DLn.

Decoder/Integrator circuit 710 of DAC 700 then detects the logic high to logic low transition of the thermometer code latched by latch circuit 114, and integrates the latched thermometer code to output the control signals C0–C31. For example, when the frequency of the launch (clock) signal LNH changes from a first frequency to a third frequency, circuit 710 can average the last edge word that represents the first frequency and the first edge word that represents the third frequency.

The result of the integrating/averaging causes only one control signal, such as control signal C22 to have a logic high. This turns on control circuit CX22 which passes the voltage on resistor node N7 to raise the supply voltage VD. The raised supply voltage VD speeds up the operation of the delay blocks DL which, in turn, causes the thermometer code to rise.

For example, supply voltage VD can rise such that propagation delay detector 110 outputs a 32-bit thermometer code of 10 highs followed by a pattern of 22 lows (1111 1111 1100 0000 0000 0000 0000 0000). As above, after the thermometer code output from propagation delay detector 110 has been latched, the reset signal RST resets each of the delay blocks DL0–DLn.

Decoder/Integrator circuit 710 of DAC 700 again detects the logic high to logic low transition of the thermometer code, and integrates the latched thermometer code to output the control signals C0–C31. The result of the integrating/averaging causes only one control signal, such as control signal C26 to have a logic high. This turns on control circuit CX26 which passes the voltage on resistor node N20 to raise the supply voltage VD.

The raised supply voltage VD further speeds up the operation of the delay blocks DL which, in turn, causes the thermometer code to again rise. This process continues until the supply voltage VD reaches a steady state point (although some oscillation may be present) defined by the gain of the loop.

One of the advantages of the present invention is that the elements of power supply system 100, including DAC 116 and the well resistors, are compatible with deep sub-micron CMOS fabrication processes. As a result, the present invention can be easily incorporated into conventional CMOS fabrication processes.

Referring again to FIG. 1, power supply system 100 can optionally include a current boosting stage 120 that is connected to the output of DAC 116. Current boosting stage 120, which can be implemented as, for example, a buffer or an operational amplifier (op amp) increases the available drive current. (An op amp can be configured with different control loop schemes, such as voltage error control or current error control.) Current boosting stage 120 can be implemented as a circuit on the same silicon as DAC 116, or as a less expensive discrete component.

Figure 10:
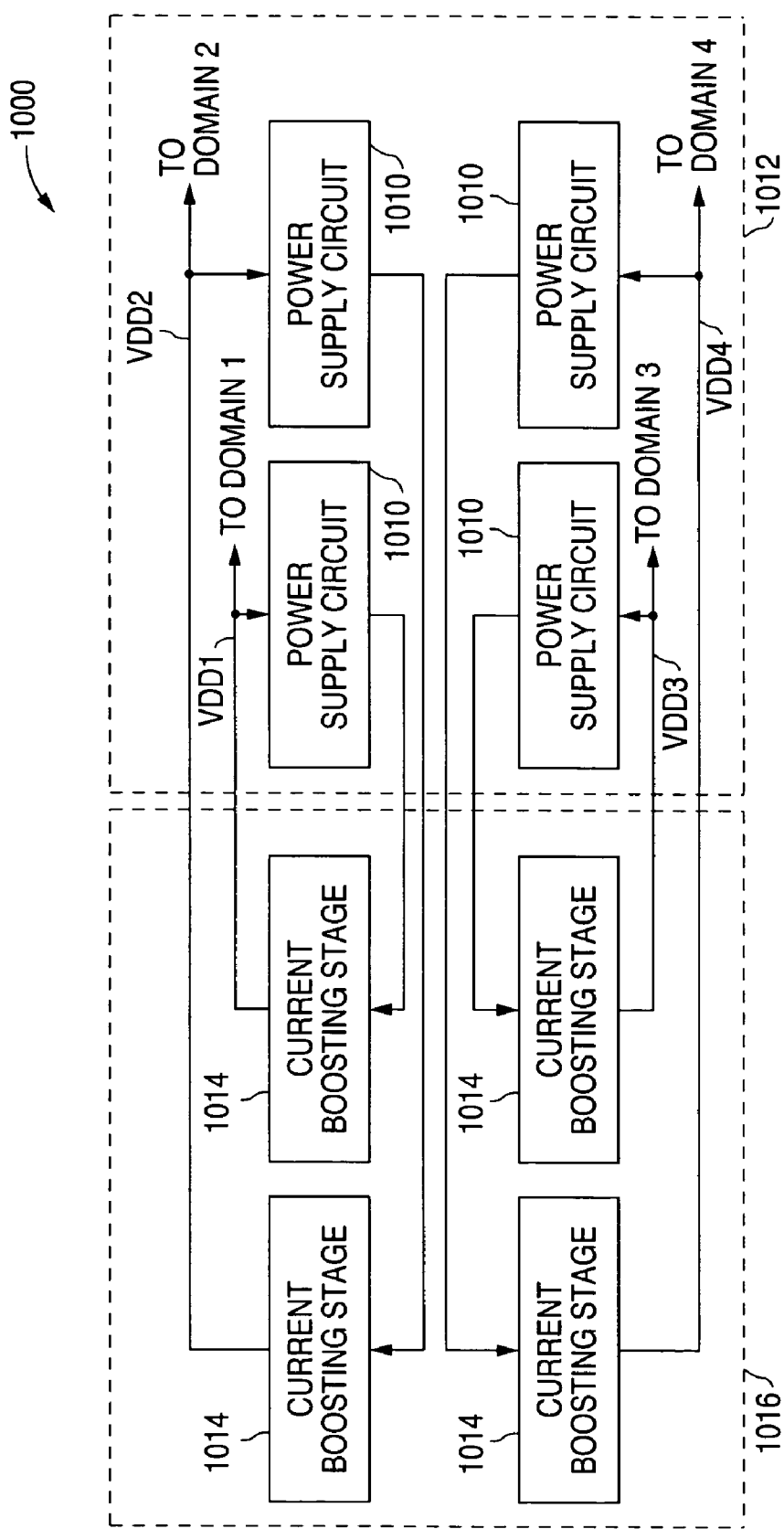
FIG. 10 is a block diagram illustrating an example of a power supply system 1000 in accordance with the present invention.

FIG. 10 shows a block diagram that illustrates an example of a power supply system 1000 in accordance with the present invention. As shown in FIG. 10, power supply system 1000 includes four power supply circuits 1010 that are formed on a first chip 1012, and four current boosting stages 1014 that are formed on a second chip 1016. The four power supply circuits 1010 can be implemented as power supply system 100 without current boosting stage 120, while each of the four current boosting stages 1014 can be implemented as a current boosting stage 120.

Thus, one of the advantages of power supply system 1000 is that power supply system 1000 can simply and inexpensively provide a first supply voltage VDD1 to a first power domain, a second supply voltage VDD2 to a second power domain, a third supply voltage VDD3 to a third power domain, and a fourth supply voltage VDD4 to a fourth power domain. As noted above, quad op amp packages are relatively inexpensive components which, in turn, provide a low-cost approach to voltage scaling with a strong current drive.

It should be understood that the above descriptions are examples of the present invention, and various alternatives to the embodiment of the invention described herein may be employed in practicing the invention. For example, common power supply elements, such as an over-voltage protection circuit, have been omitted from the present description for simplicity. Thus, it is intended that the following claims define the scope of the invention and that methods and structures within the scope of these claims and their equivalents be covered thereby.

What is claimed is:

1. A power supply system comprising:
   a detector that measures a propagation delay of a signal edge, and outputs information that identifies the propagation delay of the signal edge; and
   a voltage generator connected to the detector and a power node, the voltage generator having a number of resistive nodes, a number of resistive elements, and a number of switches, the resistive elements being connected in series such that each resistive element is connected between two resistive nodes, a first resistive element in the series being connected to a voltage source via a resistive node, a last resistive element in the series being connected to ground via a resistive node, each switch being connected to a resistive node and the power node.

2. The power supply system of claim 1 wherein the voltage generator includes a controller that processes the information to output a number of control signals to the switches, the control signals turning on a switch to place a supply voltage on the power node.

3. The power supply system of claim 2 wherein the controller includes a decoder that converts the information into an edge word that has a series of bits, only one bit of the series of bits having a first logic state, each remaining bit of the series of bits having a second logic state.

4. The power supply system of claim 3 wherein the decoder includes an exclusive OR gate.

5. The power supply system of claim 4 wherein the exclusive OR gate is free of a transmission gate.

6. The power supply system of claim 2 wherein the resistive elements are resistors.

7. The power supply system of claim 3 wherein only one control signal has a first logic state, and each remaining control signal has a second logic state.

8. The power supply system of claim 2 and further comprising a current boosting stage connected to the power node.

9. The power supply system of claim 3 wherein the information that identifies the propagation delay of the signal edge is output as a thermometer code.

10. The method of claim 9 wherein a group of edge words are averaged to generate the control signals.

11. A power supply system comprising:
    a propagation delay detector that measures a propagation delay of a launch signal, and outputs a plurality of detection signals that identify the propagation delay the propagation delay detector including a plurality of substantially equal delay blocks that have a corresponding plurality of outputs that output the plurality of detection signals as a thermometer code;
    a latch circuit that latches the detection signals as a plurality of latched signals in response to a sample signal; and
    a digital-to-analog converter (DAC) connected to the latch, the DAC receiving the plurality of latched signals, and generating a voltage on a power node in response to the plurality of latched signals.

12. The power supply of claim 11 wherein the sample signal is a quadrature signal with respect to the launch signal, and the launch signal is a clock signal.

13. The power supply of claim 11 and further comprising delay blocks that do not output a detection signal which are connected in series with the plurality of delay blocks.

14. The power supply system of claim 11 wherein the latch circuit outputs the plurality of latched signals as a thermometer code.

15. A power supply system comprising:
    a propagation delay detector that measures a propagation delay of a launch signal, and outputs a plurality of detection signals that identify the propagation delay;
    a latch circuit that latches the detection signals as a plurality of latched signals in response to a sample signal;
    a digital-to-analog converter (DAC) connected to the latch, the DAC receiving the plurality of latched signals, and generating a voltage on a power node in response to the plurality of latched signals; and
    a reset circuit that generates a reset signal in response to the launch signal and the sample signal, the reset signal resetting the propagation delay detector.

16. The power supply system of claim 15 wherein a rising edge of the sample signal precedes a rising edge of the launch signal.

17. The power supply of claim 15 wherein the power node is connected to the latch circuit and the reset circuit.

18. A power supply system comprising:
    a two or more power supply circuits, each power supply circuit having:
        a propagation delay detector that measures a propagation delay of a launch signal, and outputs a plurality of detection signals that identify the propagation delay;

a latch circuit that latches the detection signals as a plurality of latched signals in response to a sample signal; and a digital-to-analog converter (DAC) connected to the latch, the DAC receiving the plurality of latched signals, and generating a voltage on a power node in response to the plurality of latched signals; and a two or more current boosting stages, each power supply circuit being connected to a current boosting stage.

19. The power supply system of claim 18 wherein the power supply circuits are formed on a first chip, and the current boosting stages are formed on a second chip.

20. The power supply system of claim 19 wherein the current boosting stages are operational amplifiers.

21. A method of providing power, the method comprising:
measuring a propagation delay of a signal edge, and outputting information that identifies the propagation delay of the signal edge;
simultaneously generating two or more substantially constant supply voltages from a voltage source; and
processing the information to place one of the supply voltages on a power node.

22. The method of claim 21 wherein processing includes converting the information into an edge word that has a series of bits, only one bit of the series of bits having a first logic state, each remaining bit of the series of bits having a second logic state.

23. The method of claim 22 wherein the information that identifies the propagation delay of the signal edge is output as a thermometer code.

24. The method of claim 23 wherein a group of edge words are averaged to determine which one of the supply voltages is placed on the power node.

* * * * *

UNITED STATES PATENT AND TRADEMARK OFFICE
CERTIFICATE OF CORRECTION

| | | |
|---|---|---|
| PATENT NO. | : 7,030,661 B1 | |
| APPLICATION NO. | : 10/730658 | |
| DATED | : April 18, 2006 | |
| INVENTOR(S) | : Doyle | |

It is certified that error appears in the above-identified patent and that said Letters Patent is hereby corrected as shown below:

Page 2, Column 2,

Lines 5 and 6, delete "U.S. Appl. No. 10/053,858, filed Jan. 19, 2002, Maksimovic et al."

Line 9, cancel the text beginning with "Dragan Maksimovic" to and ending "pps. 1-1 through B-1".

Column 8,

Line 8, delete "LATI1" and replace with --LAT1--.

Line 34, delete "out put" and replace with --output--.

Column 10,

Lines 66 and 67, delete "(1111 11111 111111 0000 0000 0000 0000)" and replace with --(1111 1111 1111 1111 0000 0000 0000 0000)--.

Signed and Sealed this

Seventeenth Day of October, 2006

JON W. DUDAS
*Director of the United States Patent and Trademark Office*